(12) United States Patent
Lee et al.

(10) Patent No.: US 7,821,979 B2
(45) Date of Patent: Oct. 26, 2010

(54) COMMUNICATING CONTROL MESSAGES FOR POINT-TO-MULTIPOINT SERVICE IN WIRELESS COMMUNICATION SYSTEM

(75) Inventors: Young Dae Lee, Kyoungki-do (KR); Sung-Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 1067 days.

(21) Appl. No.: 11/202,600

(22) Filed: Aug. 11, 2005

(65) Prior Publication Data
US 2006/0067361 A1 Mar. 30, 2006

(30) Foreign Application Priority Data
Aug. 12, 2004 (KR) .................. 10-2004-0063646

(51) Int. Cl.
*H04H 20/71* (2008.01)
(52) U.S. Cl. ..................................... 370/312
(58) Field of Classification Search .................. 370/312
See application file for complete search history.

(56) References Cited

U.S. PATENT DOCUMENTS

| | | | | |
|---|---|---|---|---|
| 7,203,512 | B2 * | 4/2007 | Jeong et al. | 455/522 |
| 7,546,132 | B2 * | 6/2009 | Lee et al. | 455/503 |
| 2004/0087320 | A1 | 5/2004 | Kim et al. | |
| 2005/0096017 | A1 | 5/2005 | Kim | |
| 2005/0195852 | A1 * | 9/2005 | Vayanos et al. | 370/437 |
| 2005/0249140 | A1 * | 11/2005 | Lee et al. | 370/312 |
| 2006/0030342 | A1 * | 2/2006 | Hwang et al. | 455/466 |
| 2006/0040655 | A1 * | 2/2006 | Kim | 455/426.1 |
| 2006/0252439 | A1 * | 11/2006 | Cai | 455/515 |
| 2009/0201854 | A1 * | 8/2009 | Roger | 370/328 |

FOREIGN PATENT DOCUMENTS

| | | |
|---|---|---|
| WO | 98/23080 | 5/1998 |
| WO | 03/055142 | 7/2003 |
| WO | 03/101141 | 12/2003 |

(Continued)

OTHER PUBLICATIONS

LG Electronics Inc.: "MCCH Information Transmission" TSG-RANn Working Group 2 #41, [Online] Feb. 20, 2004, pp. 1-3, XP002430119 Malaga, Spain. Retrieved from the Internet: URL:http://66.102.9.104/search?q=cache:jZZ-c8krmIQJ:www.quintillion.co.jp/3GPP/TSG_RAN/TSG_RAN2004/TSG_RAN_WG2_RL2_4.html+%22In-Band+Secondary+Notification+Indicator+for+the+%22&hl=nl&ct=clnk&cd=1&gl=nl> [retrieved on Apr. 19, 2007] *the whole document*.

(Continued)

*Primary Examiner*—Marivelisse Santiago-Cordero
(74) *Attorney, Agent, or Firm*—Lee, Hong, Degerman, Kang & Waimey

(57) ABSTRACT

A method for controlling a user equipment (UE) capable of receiving a point-to-multipoint service in a wireless communication system comprises subscribing to the point-to-multipoint service. The method also comprises receiving modified point-to-multipoint control information during a certain period from the network, wherein point-to-multipoint control information is separated into at least modified point-to-multipoint control information and unmodified point-to-multipoint control information in a network. The method also comprises determining whether the modified point-to-multipoint control information comprises information associated with the point-to-multipoint service to enable reception of the point-to-multipoint service.

25 Claims, 12 Drawing Sheets

FOREIGN PATENT DOCUMENTS

| WO | 2005/079105 | 8/2005 |
|----|-------------|--------|
| WO | 2005/117297 | 12/2005 |

OTHER PUBLICATIONS

"Universal Mobile Telecommunications System (UMTS)" ETSI Standards, European Telecommunications Standards Institute, Sophia-Antipo, FR, vol. 3-R, No. V610, Jun. 2004, XP014016838 ISSN: 0000-0001 *paragraphs [5.2.3], [5.2.4] *.

LG Electronics, "Soft Combining for Critical MBMS messages" 3GPP TSG-RAN WG2 meeting #42, May 10, 2004.

Nokia et al., "Introduction of MBMS Change Information and Removal of usage of the secondary notification indicators", Change Reques, 3GPP TSG-RAN2 Meeting #43, Nov. 2004.

LG Electronics, MCCH Change Information, TSG-RAN Working Group 2 #43, August, Year Unknown.

* cited by examiner

COMMUNICATING CONTROL MESSAGES FOR POINT-TO-MULTIPOINT SERVICE IN WIRELESS COMMUNICATION SYSTEM

CROSS-REFERENCE TO RELATED APPLICATIONS

Pursuant to 35 U.S.C. §119(a), this application claims the benefit of earlier filing date and right of priority to Korean Application No. 2004-0063646, filed on Aug. 12, 2004, the contents of which are hereby incorporated by reference herein in their entirety.

FIELD OF THE INVENTION

The present invention relates generally to point-to-multipoint service in a wireless communication system and, more particularly, to control messages for point-to-multipoint service.

BACKGROUND OF THE INVENTION

Mobile communication systems typically do not perform as well as wired communication systems when handling large amounts of data. IMT-2000 is a wireless communication system designed to enable large capacity data communication.

The universal mobile telecommunications system (UMTS) is a third generation mobile communication system evolved from the European Global System for Mobile Communications (GSM) and aims to provide improved mobile communication service based upon a GSM Core Network and Wideband Code Division Multiple Access (W-CDMA) wireless connection technology.

In December 1998, the ETSI of Europe, the ARIB/TTC of Japan, the T1 of the United States, and the TTA of Korea formed the Third Generation Partnership Project (hereinafter, referred to as "3GPP"), which is currently creating a detailed specification for standardizing the UMTS.

The work towards standardizing the UMTS performed by the 3GPP has resulted in the formation of five technical specification groups (TSG), each of which is directed to forming network elements having independent operations.

Each TSG develops, approves, and manages a standard specification in a related region. Among them, a radio access network (RAN) group (hereinafter, referred to as "TSG-RAN") develops a specification for the function, items desired, and interface of a UMTS terrestrial radio access network (hereinafter, referred to as "UTRAN"), which is a new RAN (i.e., radio interface) for supporting a W-CDMA access technology in the UMTS.

FIG. 1 is a block diagram illustrating a UMTS network structure.

Referring to FIG. 1, the UMTS comprises a terminal (or User Equipment (UE)), a UTRAN 100 and a core network (hereinafter, referred to as "CN") 200.

The UTRAN 100 includes one or more radio network sub-systems (hereinafter, referred to as "RNS") 110, 120. Each RNS 110, 120 includes one radio network controller (hereinafter, referred to as "RNC") 111 and a plurality of base stations (hereinafter, referred to as "Node-Bs") 112, 113 managed by the RNC 111. One or more cells exist for each Node B.

FIG. 2 is a diagram illustrating a radio protocol architecture used in the UMTS.

Referring to FIG. 2, the radio interface protocol is horizontally formed of a physical layer, a data link layer and a network layer. The radio interface protocol is vertically divided into a user plane for transmitting data information and a control plane for transmitting a control signal. The user plane is a region in which traffic information of a user, such as voice or an Internet-protocol (IP) packet, is handled. The control plane is a region in which control information, such as an interface of a network or maintenance and management of a call, is handled.

In FIG. 2, protocol layers may be divided into a first layer (L1), a second layer (L2) and a third layer (L3) based upon the lower three layers of an open system interconnection (OSI) model well-known in the field of telecommunications.

Each layer shown in FIG. 2 will now be described.

The first layer (L1), that is, the physical layer, provides an information transfer service to the upper layer by using a physical channel. The physical layer is connected via a transport channel to a medium access control (hereinafter, referred to as "MAC") layer which is an upper layer. Signals are transferred between the MAC layer and the physical layer through the transport channel.

The L2 layer includes the MAC layer and a Radio Link Control (RLC) layer.

The MAC layer provides a re-allocation service of the MAC parameters for allocation and re-allocation of radio resources. The MAC layer is connected to the radio link control (RLC) which is an upper layer through a logical channel. Various logical channels are provided according to the kind of transmitted information. In general, when information of the control plane is transmitted, a control channel is used. When information of the user plane is transmitted, a traffic channel is used.

The RLC layer supports a reliable data transmission and may perform a function of segmentation and concatenation of an RLC service data unit (SDU) coming from a higher layer.

The L3 layer has a radio resource control (RRC) layer at a lowermost portion.

The RRC layer is defined in the control plane, and handles the controlling of logical channels, transport channels, and physical channels related to establishment, reconfiguration, and release of radio bearers (RBs). A RB service signifies a service provided by the second layer (L2) for data transmission between the terminal and the UTRAN. In general, establishment of the RB refers to the processes of stipulating the characteristics of a protocol layer and a channel, which are required for providing a certain service, and setting the respective detailed parameters and operation methods.

Hereinafter, an Multimedia Broadcast/Multicast Service (hereinafter, referred to as "MBMS") will be described in detail.

The MBMS refers to a method for providing a streaming or background service to a plurality of terminals by using MBMS bearer services only for the downlink. An MBMS service includes one or more sessions, and MBMS data is transmitted to the plurality of terminals through the MBMS bearer service only when the session is ongoing.

The UTRAN 100 provides an MBMS bearer service to a terminal using a radio bearer. There are two types of the MBMS radio bearers (RB) used by the UTRAN 100, a point-to-point RB and a point-to-multipoint RB. The point-to-point RB is a bi-directional RB, and includes a DTCH (dedicated traffic channel) as a logical channel, a DCH (dedicated channel) as a transport channel, and a DPCH (Dedicated Physical Channel) or a SCCPCH (Secondary Common Control physical Channel) as a physical channel. The point-to-multipoint RB is a uni-directional downlink RB, and includes, as shown in FIG. 3, an MTCH (MBMS Traffic Channel) as a logical channel, an FACH (Forward Access Channel) as a transport channel, and an SCCPCH as a physical channel. The logical channel MTCH is configured for each MBMS service provided to each cell, and is used to transmit user plane data of a certain MBMS service to a plurality of terminals.

The logical channel MCCH (MBMS Control Channel) of FIG. 3 is a point-to-multipoint downlink channel and is used to transmit control information related to the MBMS. The logical channel MCCH is mapped to the transport channel FACH (Forward Access Channel), and the transport channel FACH is mapped to the physical channel SCCPCH (Secondary Common Control Physical Channel). One MCCH may exist for each cell.

A UTRAN providing an MBMS transmits MCCH information to a plurality of terminals through an MCCH. Here, the MCCH information includes an RRC message related to the MBMS. For example, the MCCH information includes service information for indicating every MBMS service available in the present cell, MBMS Radio Bearer Information indicating set up information of a point-to-multipoint RB, or access information indicating that an RRC connection is requested for a certain MBMS service.

FIG. 3 is a diagram illustrating a channel mapping for a point-to-multipoint service. FIG. 4 is a diagram illustrating a transmission of control information.

Referring to FIG. 4, MCCH information is periodically transmitted according to a modification period and a repetition period. The MCCH information is divided into critical information and non-critical information. The non-critical information may be freely modified and transmitted at each modification period and repetition period. However, the critical information may be modified and transmitted only at each modification period. That is, the critical information is repeated once and transmitted at each repetition period, and transmission of the modified critical information only at the beginning of a modification period. The critical information includes, for example, the above-described service information and radio bearer information, and the non-critical information includes the access information. Only the access information may be transmitted by an exclusive period. The exclusive period by which the access information is transmitted is called an access period. The length of the access period is the same length or shorter than the repetition period. The repetition period may be expressed as a multiple of the access period, and the modification period may be expressed as a multiple of the repetition period.

The MCCH transmits "change information" at the beginning (head) of the corresponding modification period to assert how the MCCH information that is changed (updated) for a modification period corresponds to a MBMS service. The change information includes at least one MBMS service identifier related to the changed control information. Accordingly, a terminal receiving the MCCH receives the change information transmitted at the beginning of the corresponding modification period first, and then, if an identifier of the MBMS service to which the terminal has joined is included in the change information, the terminal receives MCCH information for the corresponding modification period. The change information is not transmitted at each repetition period but is transmitted only at the beginning of the corresponding modification period.

The UTRAN periodically transmits a physical channel MICH (MBMS notification indicator channel) in order to inform whether MCCH information is changed or not in a modification period. A change to the MCCH information refers to the generation, addition, modification and/or deletion of a certain item of the MCCH information. When a session of a certain MBMS service starts, the UTRAN transmits, via the MICH, an NI (notification indicator) during a certain modification period in order to notify the terminal wishing to receive the certain MBMS service that it should receive the MCCH.

A terminal which does not receive an MTCH but has joined a certain MBMS service periodically receives the indicator NI through the MICH. The terminal receives the change information of the MCCH for a modification period that follows the certain modification period, if the received NI indicates a change to MCCH information related to the certain MBMS service. After receiving the change information, the terminal continues to receive the MCCH information for the corresponding modification period when an identifier of the MBMS service which the terminal has joined is included in the change information.

On the other hand, a terminal which is already receiving the MTCH and has joined a certain MBMS service receives the change information once at each modification period. After receiving the change information, the terminal continues to receive MCCH information for the corresponding modification period if an identifier of the MBMS service which the terminal has joined is included in the change information. Since the terminal periodically receives the change information from the previous modification period, the terminal may recognize whether the MCCH information related to the service (e.g., the service that the terminal has joined) has changed or not by receiving only the change information periodically.

Because of a cell transition, a terminal which does not receive MCCH information at the previous modification period may recognize whether MCCH information related to the service has changed or not by receiving service information at the next modification period. As described above, the change information indicates an identifier of the MBMS service related to the MCCH information which is modified for the present modification period for the present cell. The service information, however, indicates an identifier of every MBMS service available in the present cell. Accordingly, the terminal which has not previously received the MCCH information must receive service information in order to determine a state (status) of every MBMS service available in the present cell.

A terminal that intends to receive a certain MBMS service using a point-to-multipoint RB receives MCCH information including radio bearer information through an MCCH and establishes the point-to-multipoint RB in the terminal using the information. After establishing the point-to-multipoint RB, the terminal continues to receive the physical channel SCCPCH to which the MTCH is mapped and therefore acquires certain MBMS service data transmitted through the MTCH.

A terminal having received the MCCH information in the previous modification period in the related art may recognize whether the MCCH information related to the service (that the terminal has joined) has changed or not by receiving only the change information at the next modification period. On the other hand, a terminal which has not received the MCCH information at the previous modification period because of a cell transition or the like may recognize that the MCCH information has changed or not by receiving service information at the next modification period. Accordingly, the UTRAN provides change information and service information at the same time for a single modification period.

The change information indicates an MBMS service identifier related to MCCH information which is changed for the present modification period in the present cell, while service information indicates an identifier of every MBMS service available in the present cell. Therefore, the identifier of the MBMS service related to the MCCH information which is changed for the present modification period is unnecessarily repeated in the change information and the service information. Accordingly, in the related art change information transmitting method, the MCCH transmission may waste resources.

Furthermore, unlike the other MCCH information, which is repeated and transmitted, the change information in the related art is transmitted only at the beginning of a modification period. In such a case, a problem may arise with respect to the reliability of the reception of the change information. In addition, when the terminal does not receive the change information, the terminal must receive every MCCH information which is transmitted thereafter.

SUMMARY OF THE INVENTION

Accordingly, the present invention is directed to communicating control messages for point-to-multipoint service that substantially obviates one or more problems due to limitations and disadvantages of the related art.

An object of the present invention is to provide for communication of control messages for a point-to-multipoint service in which change information is separated from non-change information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for controlling a user equipment (UE) capable of receiving a point-to-multipoint service in a wireless communication system comprises subscribing to the point-to-multipoint service. The method also comprises receiving modified point-to-multipoint control information during a certain period from the network, wherein point-to-multipoint control information is separated into at least modified point-to-multipoint control information and unmodified point-to-multipoint control information in a network. The method also comprises determining whether the modified point-to-multipoint control information comprises information associated with the point-to-multipoint service to enable reception of the point-to-multipoint service.

The certain period may comprise a multiple of sub-periods. Furthermore, the certain period may be a modification period. The sub-periods may be repetition periods. The modified point-to-multipoint control information may comprise a change indicator and updated control information associated with the change indicator. The change indicator may comprise a list of point-to-multipoint services that are modified in the certain period. The unmodified point-to-multipoint control information may comprise a non-change indicator and non-updated control information associated with the non-change indicator. The non-change indicator may comprise a list of point-to-multipoint services that are unmodified in the certain period.

The method may further comprise determining whether the point-to-multipoint control information was properly received in a previous certain period. The method may further comprise determining whether to receive the updated control information in the certain period based on the change indicator if the point-to-multipoint control information was properly received in the previous certain period. The method may further comprise determining whether to receive the updated control information and the non-updated control information in the certain period based on the change indicator and the non-change indicator if the point-to-multipoint control information was not properly received in the previous certain period.

The method may further comprise receiving the unmodified point-to-multipoint control information during the certain period from the network. The method may further comprise determining whether the unmodified point-to-multipoint control information comprises the information associated with the point-to-multipoint service to enable reception of the point-to-multipoint service.

The modified point-to-multipoint control information may comprise point-to-multipoint service information. The unmodified point-to-multipoint control information may comprise point-to-multipoint service information.

The method may further comprise receiving the modified point-to-multipoint control information again during the certain period if the modified point-to-multipoint control information is not properly received. The method may further comprise receiving the unmodified point-to-multipoint control information again during the certain period if the unmodified point-to-multipoint control information is not properly received.

The modified point-to-multipoint control information may be received periodically during the certain period. The modified point-to-multipoint control information may be received once during each of the repetition periods. The modified point-to-multipoint control information may not change during the certain period. The unmodified point-to-multipoint control information may be received periodically during the certain period. The network may be a UTMS terrestrial radio network (UTRAN). The method may further comprise establishing a point-to-multipoint service connection between the UE and the network.

In another embodiment, a method in a network for controlling a user equipment (UE) capable of receiving a point-to-multipoint service in a wireless communication system comprises separating point-to-multipoint control information into at least modified point-to-multipoint control information and unmodified point-to-multipoint control information. The method also comprises transmitting the modified point-to-multipoint control information to the UE periodically during a certain period.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
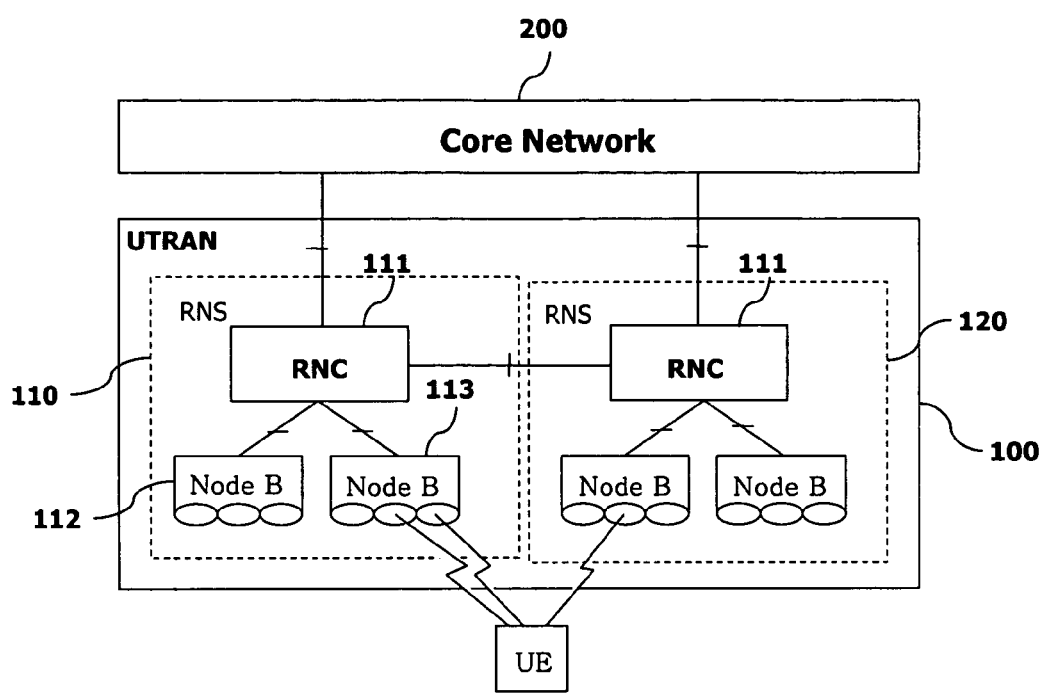
FIG. 1 is a block diagram illustrating a UMTS network structure.
Figure 2:
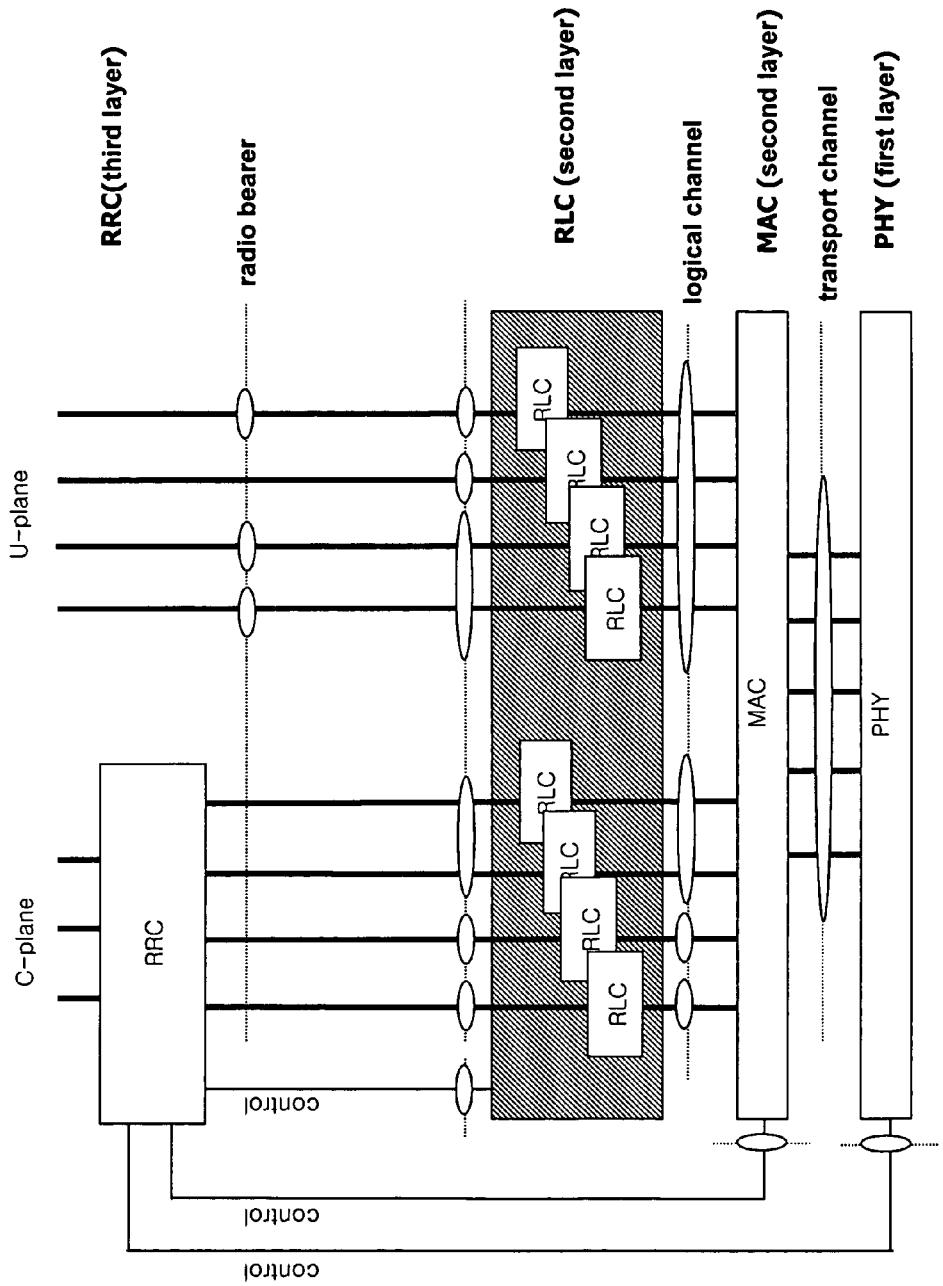
FIG. 2 is a diagram illustrating a radio protocol architecture used in the UMTS.
Figure 3:
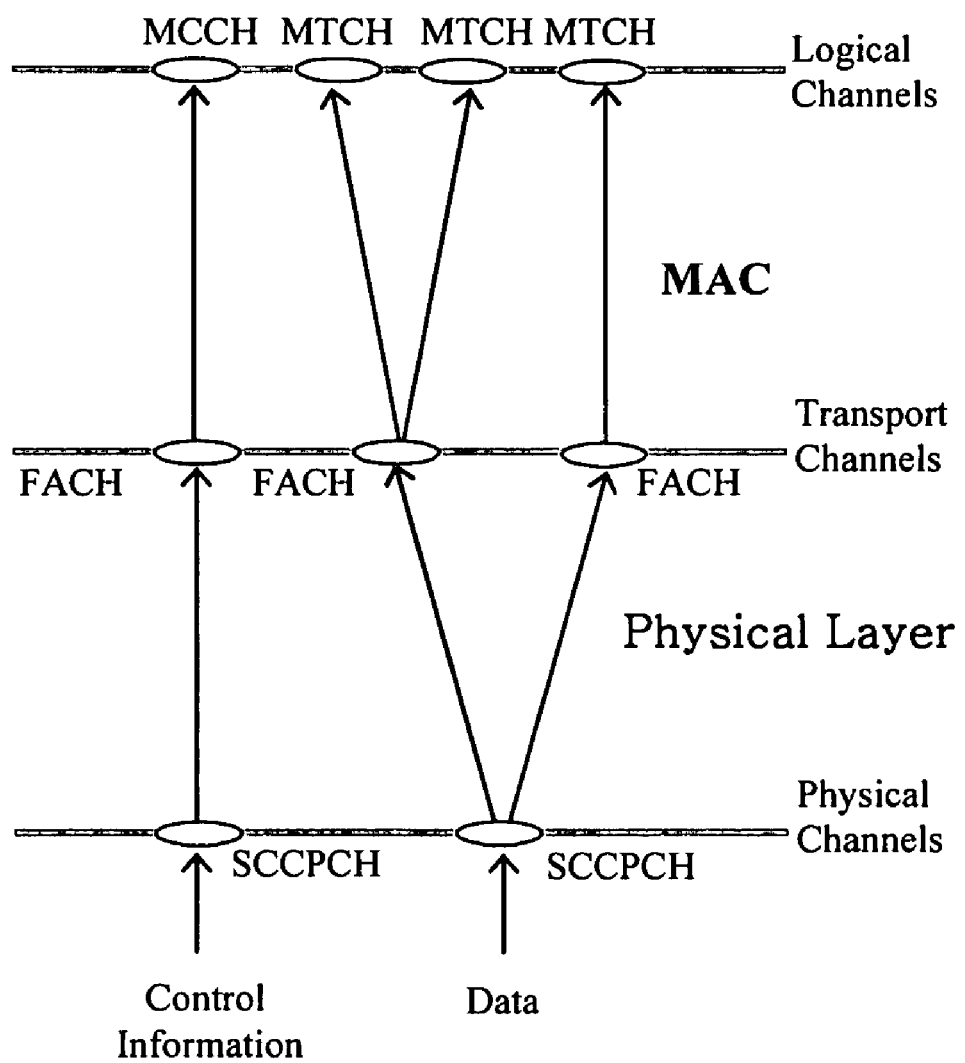
FIG. 3 is a diagram illustrating a channel mapping for a point-to-multipoint service.
Figure 4:
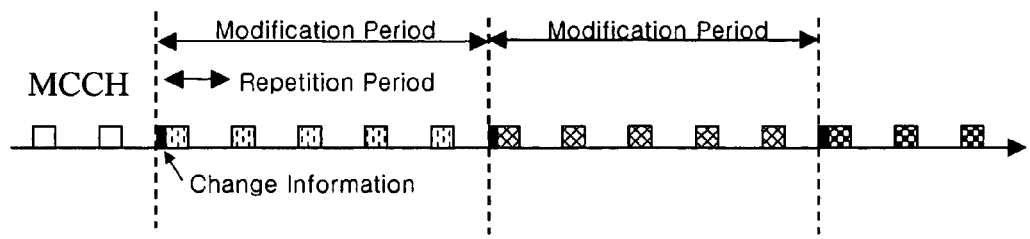
FIG. 4 is a diagram illustrating a transmission of control information.
Figure 5:
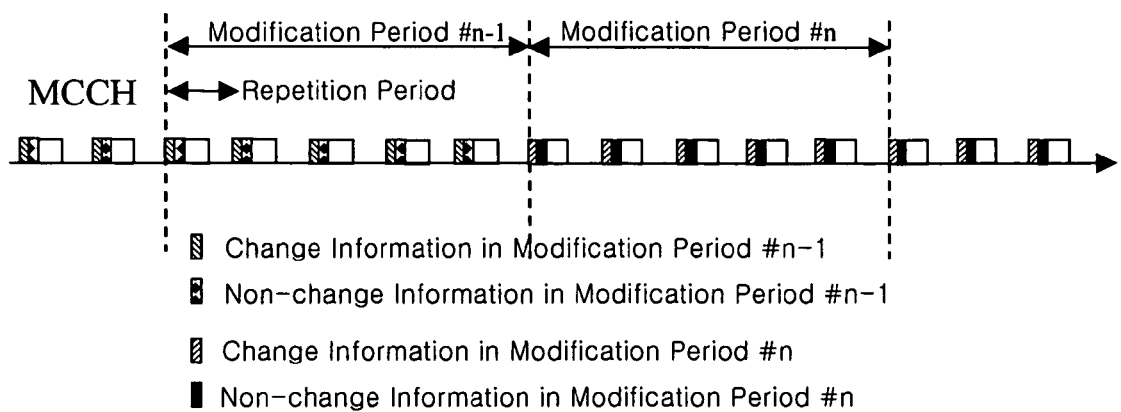
FIG. 5 is a diagram illustrating a transmission of control information in which change information is separated from non-change information, according to an embodiment of the present invention.

FIG. 5 is a diagram illustrating a transmission of control information in which change information is separated from non-change information, according to an embodiment of the present invention.

Referring to FIG. 5, change information and non-change information is transmitted once at each repetition period. In the embodiment, the change information is transmitted at the beginning of each repetition period. The non-change information is transmitted after the change information. Change information and non-change information with the same content is repeatedly transmitted during a repetition period. The content of the change information and the non-change information may be changed at the beginning of a modification period. Conventional service information may or may not be transmitted.

Transmission of information related to when each change information and non-change information is transmitted is provided through system information of an MCCH (MBMS control channel). The system information of the MCCH includes an offset between a beginning of transmission of the change information and a beginning of a modification period or repetition period. The system information of the MCCH also may include an offset between a beginning of transmission of the non-change information and a beginning of a modification period or repetition period.

Each change information and non-change information includes one or more MBMS (multimedia broadcast/multicast service) service IDs. A value tag allocated to each MBMS service ID.

An MBMS service ID included in the change information indicates that MCCH information related to a service associated with the MBMS service ID has been changed. On the other hand, an MBMS service ID included in non-change information indicates that the MCCH information related to the service associated with the MBMS service ID has not been changed.

Each MBMS service ID includes at least one value tag. When a value of a value tag transmitted for the MBMS service at a previous certain modification period is different from a value of a value tag transmitted for the MBMS service at the present modification period, the MCCH information for the MBMS service has been changed. On the other hand, when a value of a value tag transmitted for the MBMS service at a certain previous modification period is the same as a value of a value tag transmitted for the MBMS service at the present modification period, the MCCH information for the MBMS service has not been changed.

A value tag is a constant which has an initial value and a maximum value. When a session of a certain MBMS service begins, MCCH information for the service is transmitted during a certain modification period. A UTRAN (UMTS terrestrial radio access network) then includes an MBMS service ID corresponding to the MBMS service, as well as a value tag corresponding to the MBMS service, in the change information to be transmitted. In the embodiment, the value of the value tag is set to an initial value.

If the MCCH information for the MBMS service is changed at the next modification period, the UTRAN increases the value of the value tag by one level and transmits the set value. If the value tag of the previous modification period has the maximum value and the value of a value tag of the present modification period must be increased, the UTRAN sets the value of the value tag at the present modification period to an initial value and transmits the set value.

If MCCH information for a certain MBMS service is modified, the UTRAN transmits the MCCH information from a certain modification period and includes an MBMS service ID related to the MBMS service in change information for the certain modification period. A value tag related to the service may be included in the MBMS service ID. The UTRAN includes the appropriate MBMS service ID in the change information. A value tag related to the service may be also included in the change information. The UTRAN also sets an NI (notification indicator) of an MICH for the service, for the certain modification period. The terminal receives the MICH (MBMS notification indicator channel) for the certain modification period, and, if the NI for the service indicates that the MCCH information related to the service that the terminal has joined is changed, the terminal acquires change information by receiving the MCCH for the certain modification period or by receiving the MCCH for a modification period that follows the certain modification period.

An operation of the terminal in accordance with a preferred embodiment of the present invention is described below, by dividing the operation into two aspects, that is, an operation of the terminal which has received control information for a previous modification period in the present cell and an operation of the terminal which has not received control information for the previous modification period in the present cell.

Figure 6:
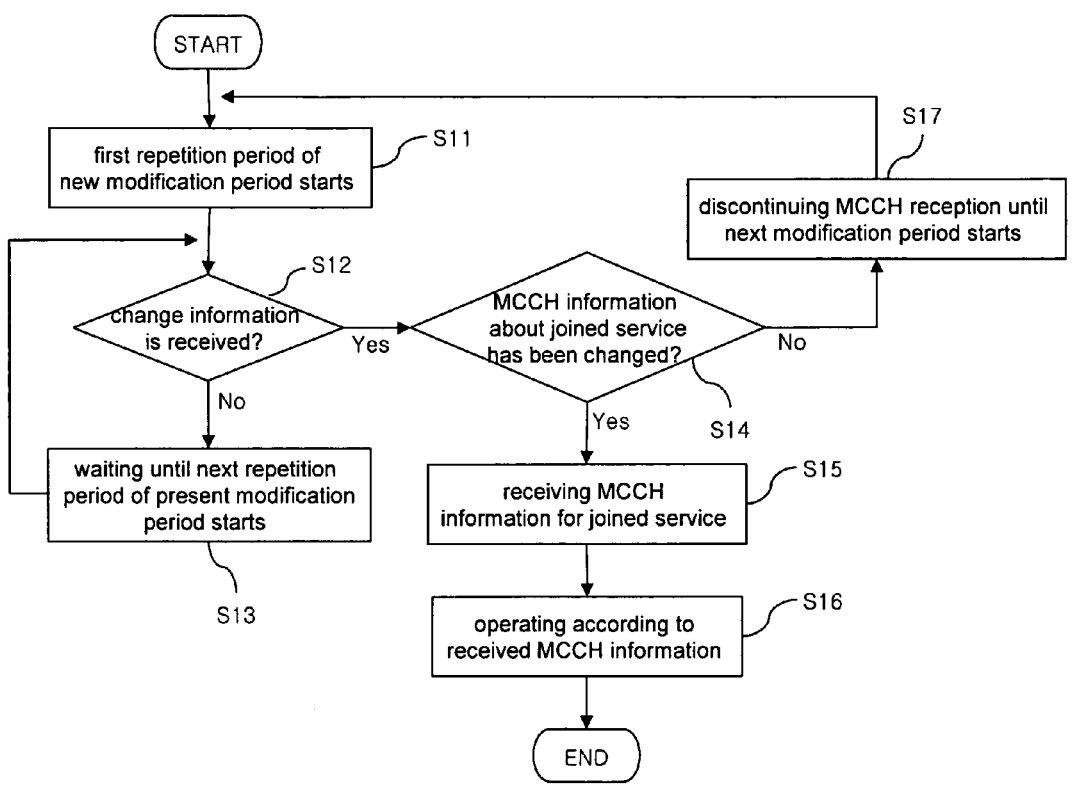
FIG. 6 is a flow diagram illustrating an operation of a user equipment that received control information in a previous modification period, according to an embodiment of the present invention.

FIG. 6 is a flow diagram illustrating an operation of a user equipment that received control information in a previous modification period, according to an embodiment of the present invention.

Referring to FIG. 6, the terminal recognizes whether MCCH information for the service that the terminal has joined at a modification period previous to the present modification period has changed. Accordingly, the terminal may recognize whether the MCCH information related to the service that the terminal has joined is changed or not at the present modification period by receiving only change information without the need for reception of non-change information at the present modification period.

With reference to FIG. 6, the operation of the terminal which has received control information in the previous modification period in the present cell is described below.

The terminal recognizes that an initial repetition period of a new modification period starts (S11). Then, the terminal receives change information transmitted at the present repetition period (S12).

If the terminal fails to receive the change information at the present repetition period, the terminal delays reception of the change information until the beginning of the next repetition period (S13). On the other hand, if the terminal has received the change information at the present repetition period, the terminal determines whether MCCH information related to an MBMS service that the terminal has joined has been changed or not at the present modification period by using the received change information (S14).

As a result of such determination (S14), when the MCCH information for the MBMS service that the terminal has joined has been changed at the present modification period, the terminal receives the changed MCCH information for the present modification period (S15). The terminal stores a value tag, included in the change information, for the MBMS service. The terminal determines an operation according to the changed MCCH information which the terminal has received (S16).

As a result of such a determination (S14), when the MCCH information for the MBMS service has not been changed at the present modification period, the terminal delays reception of an MCCH until the beginning of the next modification period (S17).

In the determining step (S14), if an MBMS service ID related to the MBMS service that the terminal has joined is included in the received change information, the terminal determines whether the MCCH information for the MBMS service that the terminal has joined has been changed or not at the present modification period using the MBMS service ID included in the received change information. If the MBMS service ID related to the MBMS service that the terminal has joined is included, the terminal determines that the MCCH information related to the service has been changed at the present modification period. On the other hand, if the MBMS service ID for the MBMS service that the terminal has joined is not included, the terminal determines that the MCCH information related to the service has not been changed at the present modification period.

Furthermore, in the determining step (S14), if an MBMS service ID and a value tag related to the MBMS service that the terminal has joined are included in the change information, the terminal compares a value tag for the service which is stored at the previous modification period and the value tag for the service which is included in the change information received at the present modification period. If the two value tags have different values, the terminal determines that the MCCH information related to the service has been changed at the present modification period. If the two value tags have the same values, the terminal determines that the MCCH information related to the service has not been changed at the present modification period. After such a comparison, the terminal deletes the value tag related to the service which is stored at the previous modification period and stores the value tag related to the service which is included in the change information that the terminal has received at the present modification period. Furthermore, in this step, if there is no value tag related to the service which the terminal stores at the previous modification period, the terminal stores the value tag related to the service which is included in the change information which the terminal has received at the present modification period, and determines that the MCCH information related to the service has been changed at the present modification period.

Figure 7:
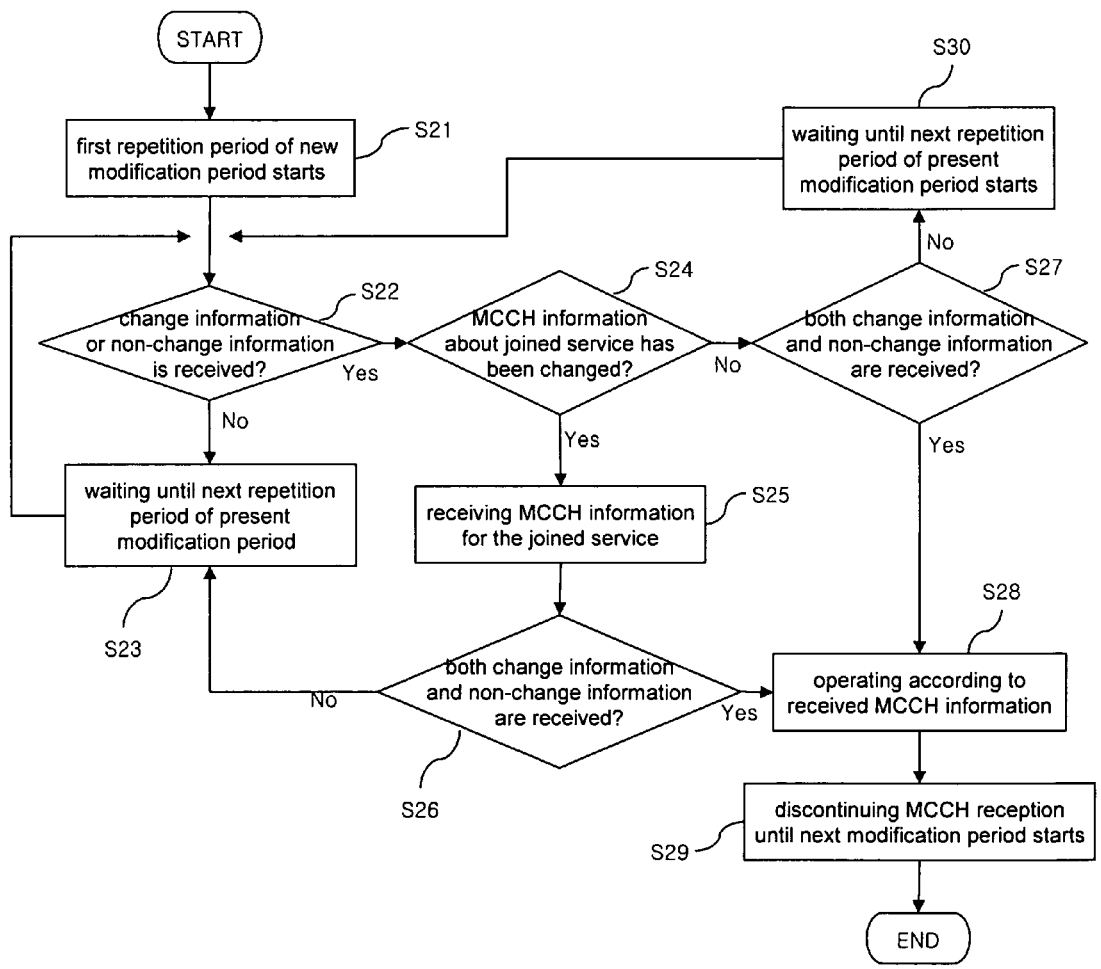
FIG. 7 is a flow diagram illustrating an operation of the user equipment that did not receive control information in a previous modification period, according to another embodiment of the present invention.

FIG. 7 is a flow diagram illustrating an operation of the user equipment that did not receive control information in a previous modification period, according to another embodiment of the present invention.

Referring to FIG. 7, because the terminal did not receive control information the previous modification period, the terminal is unable to recognize whether the MCCH information related to the service that the terminal has joined at a previous modification period is changed or not. Such case may occur, for example, when the terminal moves from a previous cell to the present cell or when the terminal began an MBMS service in the present cell. Accordingly, the terminal recognizes whether MCCH information related to the service that the terminal has joined is changed or not at the present modification period by receiving both change information and non-change information at the present modification period.

With reference to FIG. 7, an operation of a terminal which has not received a previous modification period in the present cell is described below.

The terminal recognizes that an initial repetition period of a new modification period has begun (S21). Then, the terminal attempts to receive change information and non-change information transmitted at the present repetition period (S22). The terminal operates differently according to whether the terminal receives change information or non-change information at the present repetition period.

If the terminal has not received change information or non-change information at the present repetition period, the terminal delays reception of the change information and the non-change information until the beginning of the next repetition period (S23). However, if the terminal has received the change information or the non-change information at the present repetition period, the terminal determines whether MCCH information related to an MBMS service that the terminal has joined at present has been changed or not at the present modification period, using the received change information and/or non-change information (S24).

As a result of such determination (S24), if the MCCH information for the MBMS service that the present terminal has joined has been changed at the present modification period, the terminal receives the changed MCCH information for the present modification period (S25). In addition, the terminal stores a value tag related to the MBMS service that the terminal joined. The value tag is included in the change information.

In the receiving step (S25), if the terminal receives both the change information and the non-change information, the terminal performs operation processes S28 and S29 (S26). On the other hand, if the terminal does not receive the change information and/or the non-change information, the terminal delays reception of the change information and the non-change information until the beginning of the next repetition period.

As a result of such a determination (S24), if the MCCH information for the MBMS service that the terminal has joined has not been changed at the present modification period, the terminal checks whether the terminal has received both the change information and non-change information at the present modification period (S27). If the terminal has received both the change information and non-change information at the present modification period, the terminal determines an operation according to the changed MCCH information which the terminal receives at the present modification period (S28). Then, the terminal delays MCCH reception until the beginning of the next modification period (S29). Then, the terminal may operate as illustrated in FIG. 6 as the next modification period begins.

However, if, based on a result of such a check of the reception (S27), the terminal has not received both the change information and non-change information, the terminal delays reception of the change information and the non-change information until the beginning of the next repetition period (S30).

In the determining step (S24), the terminal determines whether the MCCH information for the MBMS service that the terminal has joined has been changed at the present modification period by using an MBMS service ID included in the change information that the terminal receives at the present modification period, an MBMS service ID included in the received non-change information at the present modification period, and a value tag.

If the MBMS service ID related to the MBMS service that the terminal has joined is included in the change information, the terminal determines that the MCCH information related to the service has been changed at the present modification period. On the other hand, if the MBMS service ID related to the MBMS service that the terminal has joined is not included in the change information, the terminal determines that the MCCH information related to the service has not been changed at the present modification period.

During the determining step (S24), if the MBMS service ID and the value tag related to the MBMS service that the terminal has joined is included in the change information, the terminal compares a value tag related to the service which is stored at the previous modification period and the value tag related to the service which is included in the change information received at the present modification period. If the two value tags have different values, the terminal determines that the MCCH information related to the service has been changed at the present modification period. If the two value tags have the same values, the terminal determines that the MCCH information related to the service has not been changed at the present modification period. After such a comparison, the terminal deletes the value tag related to the service which is stored at the previous modification period and stores the value tag related to the service which is included in the change information that the terminal receives at the present modification period. During this process, if there is no value tag related to the service which the terminal stores at the previous modification period, the terminal stores the value tag related to the service which is included in the change information received at the present modification period, and determines that the MCCH information related to the service has been changed at the present modification period.

If the MBMS service ID and the value tag related to the MBMS service that the terminal has joined is included in the non-change information, the terminal compares a value tag related to the service which is stored at the previous modification period and the value tag related to the service which is included in the change information received at the present modification period. If the two value tags have different values, the terminal determines that the MCCH information related to the service has been changed at the present modification period. If the two value tags have the same values, the terminal determines that the MCCH information related to the service has not been changed at the present modification period. After such a comparison, the terminal deletes the value tag related to the service which is stored at the previous modification period and stores the value tag related to the service which is included in the change information that the terminal receives at the present modification period. During this process, if there is no value tag related to the service which the terminal stores at the previous modification period, the terminal stores the value tag related to the service which is included in the change information received at the present modification period, and determines that the MCCH information related to the service has been changed at the present modification period.

Figure 8:
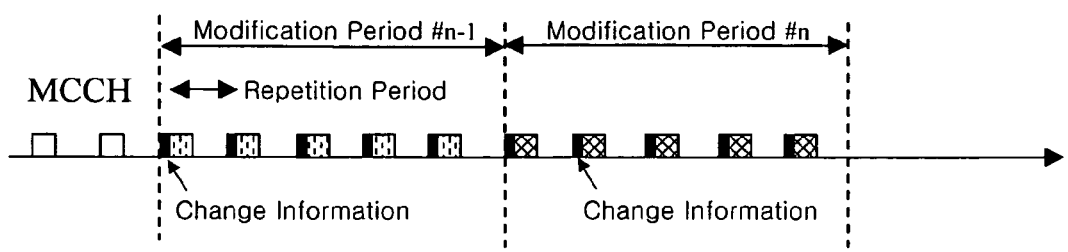
FIG. 8 is a diagram illustrating a transmission of control information in which change information is separated from non-change information, according to another embodiment of the present invention.

FIG. 8 is a diagram illustrating a transmission of control information in which change information is separated from non-change information, according to another embodiment of the present invention.

Referring to FIG. 8, change information is repeated and transmitted once at each repetition period. In the embodiment, the change information is transmitted at the beginning of each repetition period. The change information having the same content within one repetition period is transmitted at each repetition period. The content of the change information may be modified when a modification period begins. The non-change information may or may not be transmitted. Conventional service information may also be transmitted.

At the present modification period, the change information may include change information related to at least one previous modification period. The change information related to the at least one previous modification period includes one or more MBMS service IDs, each having a value tag. A value tag indicates a certain modification period at which MCCH information related to one or more services has been changed. An MBMS service ID connected to the value tag indicates that MCCH information related to a corresponding MBMS service has been changed for the certain modification period.

For example, assuming that the present modification period is #n−1, a value tag is #m+2, and each MCCH information related to MBMS services #5 and #7 is modified for the present modification period, change information for the modification period #n−1 may be constructed as shown in Table 1, below. The latest value tag m+2 is called the newest value tag.

TABLE 1

Value tag = m + 1
  MBMS service ID = 5, 17
Value tag = m + 2

At the next modification period #n, assuming that the latest value tag is #m+3 and each MCCH information related to MBMS services #8, #17 and #33 is modified for the modification period #n, change information for the modification period #n may be constructed as shown in Table 2, below.

TABLE 2

| |
|---|
| value tag = m + 1 |
|    MBMS service ID = 5, 17 |
| value tag = m + 2 |
|    MBMS service ID = 8, 17, 33 |
| value tag = m + 3 |

The change information related to the present modification period may be constructed such that a service list that is changed at the present modification period is added to the content of the change information of the previous modification period. In addition, the change information of the present modification period may correspond to the content of change information of the previous modification period.

Furthermore, if modification MCCH information does not exist at the next modification period #n+1, change information for the modification period #n+1 may be constructed the same way as that for the modification period #n and then may be transmitted. That is, if modification MCCH information does not exist at the modification period #n+1, change information for the modification period #n+1 may be the same as that in Table 2. Accordingly, when modification MCCH information does not exist at a certain modification period, change information is not modified. According to another embodiment, if modification MCCH information does not exist at the next modification period #n+1, change information is modified, and the change information for the modification period #n+1 is constructed as shown in Table 3, below, and then is transmitted.

TABLE 3

| |
|---|
| value tag = m + 1 |
|    MBMS service ID = 5, 17 |
| value tag = m + 2 |
|    MBMS service ID = 8, 17, 33 |
| value tag = m + 3 |
| value tag = m + 4 |

Table 3 shows that the newest value tag is #m+4 and MCCH information is changed while the value tag is changed from #m+3 to #m+4.

In another example, assuming that change information for the modification period #n+1 is the same as that in Table 3 and MCCH information related to an MBMS service #14 is modified at the next modification period #n+2, change information for the modification period #n may be constructed as shown in Table 4, below. In the example, the newest value tag is #m+5.

TABLE 4

| |
|---|
| value tag = m + 1 |
|    MBMS service ID = 5, 17 |
| value tag = m + 2 |
|    MBMS service ID = 8, 17, 33 |
| value tag = m + 3 |
| value tag = m + 4 |
|    MBMS service ID = 14 |
| value tag = m + 5 |

Furthermore, change information of the present modification period may be constructed such that a record part of a previous modification period is constructed as shown in Table 5, below. As shown in Table 5, MBMS service IDs between a value tag (i.e., #m+4 in Table 5) related to a certain point in time, and a value tag (i.e., #m+1 in Table 5) related to a previous point in time may be integrated. In the example, the value tags between the two value tags (#m+4 and #m+1 in Table 5) are not displayed in the change information.

TABLE 5

| |
|---|
| value tag = m + 1 |
|    MBMS service ID = 5, 8, 17, 33 |
| value tag = m + 4 |
|    MBMS service ID = 14 |
| value tag = m + 5 |

In the UTRAN, if MCCH information for a certain MBMS service is modified, the UTRAN transmits the MCCH information related to a certain modification period, and includes an MBMS service ID related to the service in change information related the certain modification period. In addition, the UTRAN sets up an NI of an MICH for the service for the certain modification period. The terminal receives the MICH for the certain modification period, and, if the NI for the service indicates a modification of the MCCH information related to the service, the terminal acquires change information by receiving the MCCH for the certain modification period, for example, by receiving the MCCH for a modification period that follows the certain modification period.

Figure 9:
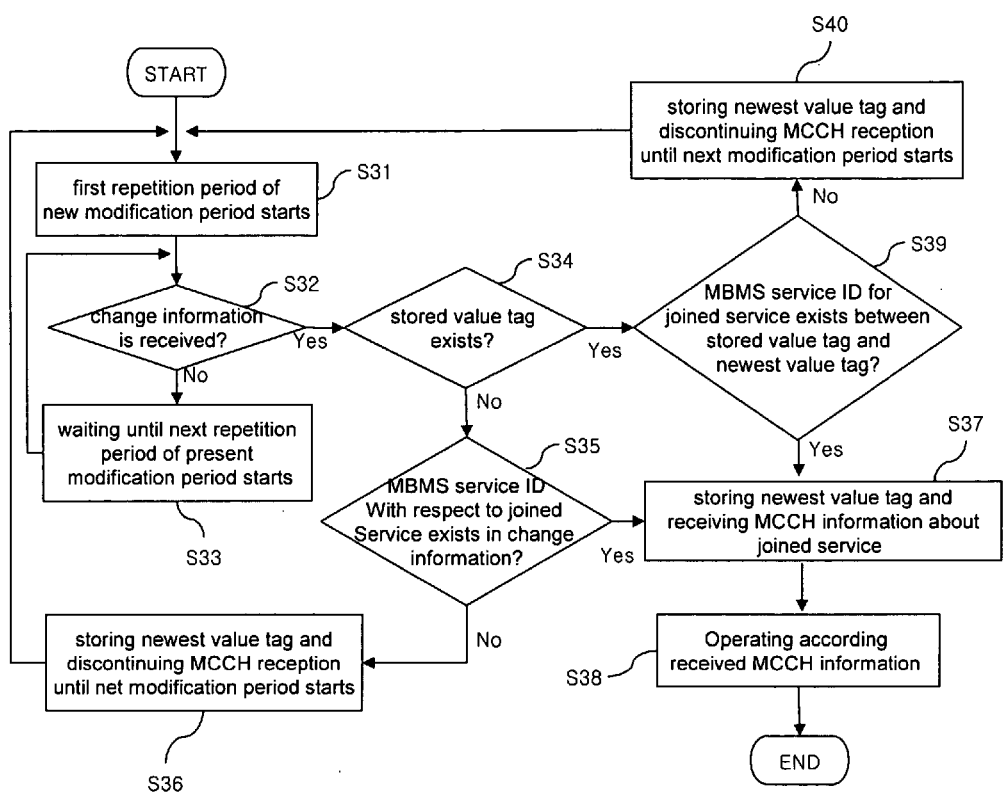
FIG. 9 is a flow diagram illustrating an operation of a user equipment, in accordance with the embodiment described with reference to FIG. 8.

FIG. 9 is a flow diagram illustrating an operation of a user equipment, in accordance with the embodiment described with reference to FIG. 8.

Referring to FIG. 9, assuming the terminal has received control information in a previous modification period, the terminal recognizes whether MCCH information related to the service the terminal joined at a previous modification period has changed or not. Accordingly, the terminal may recognize whether the MCCH information related to the service has changed at the present modification period by receiving only change information without receiving non-change information at the present modification period.

With reference to FIG. 9, an operation of the terminal in accordance with a preferred embodiment of the present invention is described below.

The terminal recognizes that an initial repetition period of a new modification period has begun (S31). The terminal then receives change information transmitted at the present repetition period (S32).

If the terminal fails to receive the change information at the present repetition period, the terminal delays reception of the change information until the beginning of the next repetition period (S33). If the terminal has received the change information at the present repetition period, the terminal determines whether or not a value tag related to the present cell is stored (S34).

As a result of such a determination (S34), if the terminal does not store the value tag related to the present cell, the terminal examines whether or not an MBMS service ID exists that corresponds to a service that the terminal joined, among all MBMS service IDs included in the received change information (e.g., among MBMS service IDs related to previous and present modification periods).

In the examining process (S35), if the terminal is unable to search for the MBMS service ID corresponding to the service that the terminal joined, the terminal stores the newest value tag among the value tags in the present change information and delays MCCH reception until the beginning of the next modification period (S36).

On the other hand, if, in the examining step (S35), the terminal searches for the MBMS service ID corresponding to the service that the terminal has joined, the terminal stores the newest value tag among the value tags in the present change information and receives MCCH information related to the joined service (S37). Then, the terminal determines an operation according to the changed MCCH information that the terminal has received (S38).

As a result of the determination (S34), if the terminal stores the value tag related to the present cell, the terminal examines whether or not an MBMS service ID exists that corresponds to the service that the terminal has joined, among all MBMS service IDs included between the stored value tag and the newest value tag in the received change information (S39). If, in the examining step (S39), the terminal is unable to search for the MBMS service ID corresponding to the joined service, the terminal stores the newest value tag of the value tags in the present change information and delays MCCH reception until the beginning of the next modification period (S40).

However, if, in the examining step (S39), if the terminal searches for the MBMS service ID corresponding to the joined service, the terminal stores the newest value tag of the value tags in the present change information and receives MCCH information related to the service that the terminal has joined (S37). Then, the terminal determines an operation according to the received changed MCCH information (S38).

A method for transmitting updated MCCH information and non-updated MCCH information in accordance with a preferred embodiment the present invention is described below.

Figure 10:
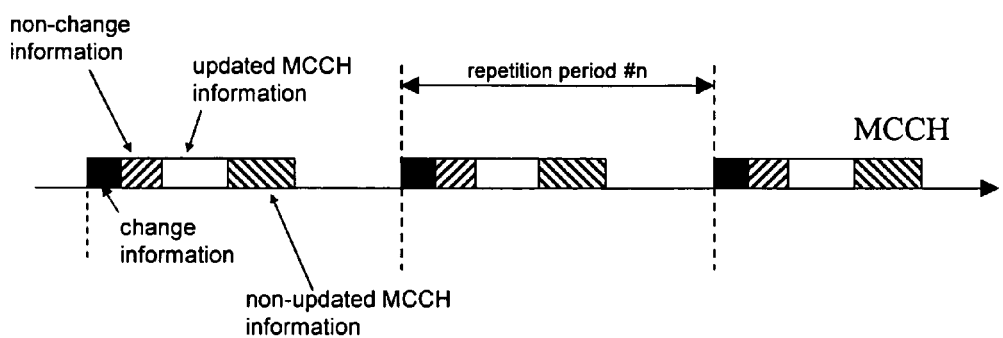
FIG. 10 is a diagram illustrating a transmission of control information in which change information is separated from non-change information, according to yet another embodiment of the present invention.

FIG. 10 is a diagram illustrating a transmission of control information in which change information is separated from non-change information, according to yet another embodiment of the present invention. That is, MCCH information is divided into updated MCCH information which is changed (updated) at the present modification period and non-updated information which is not changed (not updated) at the present modification period. Each updated information and non-updated information is transmitted at each repetition period.

Referring to FIG. 10, information may be transmitted in a repetition period such that change information is transmitted before non-change information, for example. Then, updated MCCH information and non-updated MCCH information may be transmitted. In one embodiment, the non-change information is not transmitted.

Scheduling information related to when the updated MCCH information is transmitted may be included in the change information. In addition, scheduling information related to when the non-updated MCCH information is transmitted may be included in the non-change information. In one embodiment, the change information includes an offset between a beginning of transmission of the updated MCCH information and a beginning of a modification period or repetition period. The non-change information includes an offset between a beginning of transmission of the non-change information and a beginning of a modification period or repetition period.

In another embodiment, updated MCCH information and non-updated MCCH information may be transmitted through system information of a BCCH. In the embodiment, the system information of the BCCH includes an offset between a beginning of transmission of the updated MCCH information and a beginning of a modification period or repetition period. The system information also includes an offset between a beginning of transmission of the non-updated MCCH information and a beginning of a modification period or repetition period.

Accordingly, the terminal may recognize when the updated MCCH information and the non-updated MCCH information are transmitted by receiving the change information and non-change information, or by receiving the system information of the BCCH. The terminal may then receive the change information and/or the non-change information at the beginning of the modification period or repetition period.

The updated MCCH information may include one or more MBMS service IDs. The MBMS service ID included in the updated MCCH information indicates that information related to the corresponding MBMS service is updated at the present modification period. In addition, the updated MCCH information includes MCCH information related to the corresponding MBMS service.

If the updated MCCH information does not include the MBMS service ID, information included in the updated MCCH information may be transmitted according to an arranged order of MBMS service IDs in the change information. For example, if MBMS service IDs #3, #7 and #20 are sequentially arranged in the change information, the updated MCCH information may arrange information related to the MBMS service #3, information related to the MBMS service #7 and information related to the MBMS service #20 in such order. Accordingly, the terminal receives the change information and may determine information related to a certain service, even though the MBMS service ID is not included in the updated MCCH information.

The non-updated MCCH information may include one or more MBMS service IDs. The MBMS service ID included in the non-change MCCH information indicates that information of the corresponding MBMS service is not updated at the present modification period. In addition, the non-updated MCCH information includes MCCH information related to the corresponding MBMS service.

If the non-updated MCCH information does not include the MBMS service ID, information included in the non-updated MCCH information is transmitted according to an arranged order of MBMS service IDs in the non-change information. For example, if MBMS service IDs #10 and #21 are sequentially arranged in non-change information, non-updated MCCH information may arrange information related to the MBMS service #10 and information related to the MBMS service #21 according to such order. Accordingly, the terminal receives the non-change information and may determine information related to a certain service, even though the MBMS service ID is not included in the updated MCCH information.

MCCH information for an MBMS service may be included in updated MCCH information or non-updated MCCH information. Accordingly, if the MCCH information related to the MBMS service has been updated, the MCCH information is included only in the updated MCCH information. However, if the MCCH information for the MBMS service has not been updated, the MCCH information is included only in the non-updated MCCH information.

Each updated MCCH information and non-updated MCCH information may be transmitted in RRC messages. In addition, information in the updated MCCH information or the non-updated MCCH information may be divided into one or more RRC messages. If the updated MCCH information or the non-updated MCCH information is divided into RRC messages related to information of different MBMS services, information of the different MBMS services in the updated MCCH information or the non-updated MCCH information is divided into different RRC messages and transmitted according to, for example, the above-described order.

A terminal's receiving of MCCH information (updated MCCH information or non-updated MCCH information) in accordance with a preferred embodiment of the present invention is described below.

Figure 11:
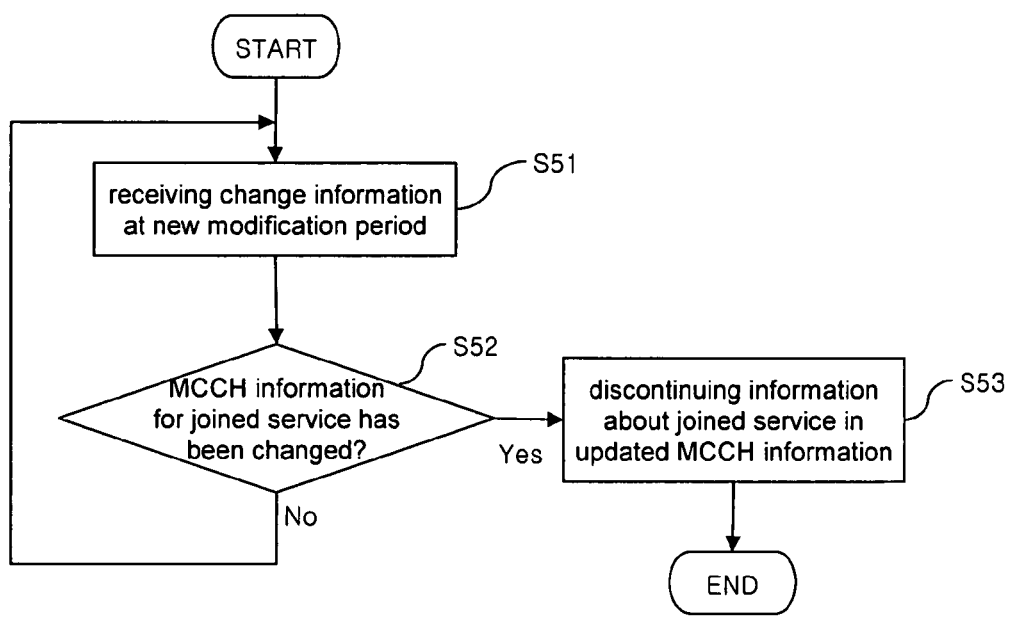
FIG. 11 is a flow diagram illustrating an operation of a user equipment that received control information in a previous modification period, according to yet another embodiment of the present invention.

FIG. 11 is a flow diagram illustrating an operation of a user equipment that received control information in a previous modification period, according to yet another embodiment of the present invention.

Referring to FIG. 11, a terminal receives change information transmitted at a new modification period (S51). Then, the terminal determines whether MCCH information related to the service that the terminal joined has been changed or not at the present modification period (S52). The determination (S52) may be performed using the change information. If the MCCH information related to the service that the terminal joined has not been changed at the present modification period, the terminal delays reception of the MCCH information until a new modification period.

On the other hand, if the MCCH information related to the service that the terminal joined has been changed, the terminal receives updated MCCH information using the change information as aforementioned and acquires the contents (S53).

Figure 12:
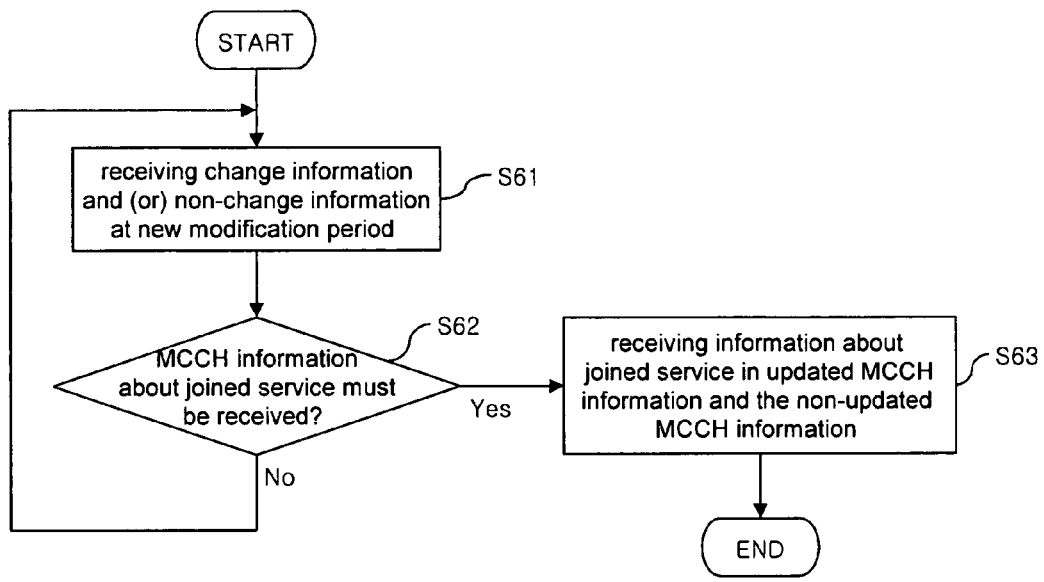
FIG. 12 is a flow diagram illustrating an operation of the user equipment that did not receive control information in a previous modification period, according to still another embodiment of the present invention.

FIG. 12 is a flow diagram illustrating an operation of the user equipment that did not receive control information in a previous modification period, according to still another embodiment of the present invention.

Referring to FIG. 12, a terminal receives change information and/or non-change information transmitted at a new modification period (S61). Then, the terminal determines whether or not to receive MCCH information for the service that the terminal joined at the present modification period (S62). The terminal determines to receive updated MCCH information at the present modification period when the received change information indicates that the MCCH information related to the service that the terminal has joined has been changed. Furthermore, the terminal determines to receive non-updated MCCH information at the present modification period when a value tag included in the received non-change information is different from a value tag stored in the terminal. If the non-change information is not transmitted, the terminal determines to receive non-updated MCCH information at the present modification period.

In the determining step (S62), if the terminal determines not to receive the updated MCCH information and the non-updated MCCH information at the present modification period, the terminal delays reception of the MCCH information until a new modification period. On the other hand, if the terminal determines to receive the updated MCCH information and the non-updated MCCH information at the present modification period, the terminal receives the updated MCCH information and/or the non-updated MCCH information according to the determination (S62).

The UTRAN may transmit common MCCH information once at each repetition period in addition to change information, non-change information, updated MCCH information and non-updated MCCH information. The common MCCH information may include MCCH information which does not relate to a certain service, that is, information which is common to every service (e.g., radio bearer predefined configuration information). Regarding the common MCCH information, the same information may be repeatedly transmitted within the same modification period. The common MCCH information may be modified in a subsequent modification period.

The terminal receives the common MCCH information if change information related to a certain modification period indicates a modification of the common MCCH information. On the other hand, if non-change information for a certain modification period indicates a non-modification of the common MCCH information, a terminal that has previously received common MCCH information does not receive the present common MCCH information. However, a terminal that has not previously received common MCCH information receives the present common MCCH information.

The change information and non-change information each may include a common value tag for the common MCCH information. The terminal compares a common value tag related to the present modification period with a common value tag related to the previous modification period, and, if the values are different, the terminal recognizes that the common MCCH information is modified at a corresponding modification period. However, if the values of the common value tags are the same, the terminal recognizes that the common MCCH information is not modified at a corresponding modification period. Operation of the common value tag may be similar to that of the aforementioned value tag.

The value tag and the common value tag may be operated as an indicator for an independent cell or as a common indicator for a plurality of cells. When the value tag and the common value tag are operated as an indicator for an independent cell, the terminal may be unable to determine whether the value tag of the present cell has been changed or not by comparing an indicator stored in the previous cell with an indicator transmitted in the present cell. Thus, in the case of a cell transition, the terminal may delete the indicator stored in the previous cell. On the other hand, when the value tag and the common value tag are operated as a common indicator, the terminal may determine whether the value tag of the present cell has been changed or not by comparing an indicator stored in the previous cell with an indicator transmitted in the present cell. Thus, the terminal may store the indicator stored in the previous cell even in the case of cell transition.

In one embodiment, a method for controlling a user equipment (UE) capable of receiving a point-to-multipoint service in a wireless communication system comprises subscribing to the point-to-multipoint service. The method also comprises receiving modified point-to-multipoint control information during a certain period from the network, wherein point-to-multipoint control information is separated into at least modified point-to-multipoint control information and unmodified point-to-multipoint control information in a network. The method also comprises determining whether the modified point-to-multipoint control information comprises information associated with the point-to-multipoint service to enable reception of the point-to-multipoint service.

The certain period may comprise a multiple of sub-periods. Furthermore, the certain period may be a modification period. The sub-periods may be repetition periods. The modified point-to-multipoint control information may comprise a change indicator and updated control information associated with the change indicator. The change indicator may comprise a list of point-to-multipoint services that are modified in the certain period. The unmodified point-to-multipoint control information may comprise a non-change indicator and non-updated control information associated with the non-change indicator. The non-change indicator may comprise a list of point-to-multipoint services that are unmodified in the certain period.

The method may further comprise determining whether the point-to-multipoint control information was properly received in a previous certain period. The method may further comprise determining whether to receive the updated control information in the certain period based on the change indicator if the point-to-multipoint control information was properly received in the previous certain period. The method may further comprise determining whether to receive the updated control information and the non-updated control information in the certain period based on the change indicator and the non-change indicator if the point-to-multipoint control information was not properly received in the previous certain period.

The method may further comprise receiving the unmodified point-to-multipoint control information during the certain period from the network. The method may further comprise determining whether the unmodified point-to-multipoint control information comprises the information associated with the point-to-multipoint service to enable reception of the point-to-multipoint service.

The modified point-to-multipoint control information may comprise point-to-multipoint service information. The unmodified point-to-multipoint control information may comprise point-to-multipoint service information.

The method may further comprise receiving the modified point-to-multipoint control information again during the certain period if the modified point-to-multipoint control information is not properly received. The method may further comprise receiving the unmodified point-to-multipoint control information again during the certain period if the unmodified point-to-multipoint control information is not properly received.

The modified point-to-multipoint control information may be received periodically during the certain period. The modified point-to-multipoint control information may be received once during each of the repetition periods. The modified point-to-multipoint control information may not change during the certain period. The unmodified point-to-multipoint control information may be received periodically during the certain period. The network may be a UTMS terrestrial radio network (UTRAN). The method may further comprise establishing a point-to-multipoint service connection between the UE and the network.

In another embodiment, a method in a network for controlling a user equipment (UE) capable of receiving a point-to-multipoint service in a wireless communication system comprises separating point-to-multipoint control information into at least modified point-to-multipoint control information and unmodified point-to-multipoint control information. The method also comprises transmitting the modified point-to-multipoint control information to the UE periodically during a certain period.

The present invention provides wireless system control messages, such that change information that is changed is separated from change information that is not changed at the present modification period. The separated change information is transmitted at each repetition period. A wireless terminal receives the separated change information. The present invention, therefore, may provide for transmission of change information related to MCCH information more efficiently and reliably.

Terminal, as used herein, may refer to a user equipment (UE).

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for controlling user equipment (UE) capable of receiving a point-to-multipoint service in a wireless communication system, the method comprising:

receiving point-to-multipoint service information comprising at least one service identifier during a certain period from a network, the point-to-multipoint service information separated into at least modified point-to-multipoint service information and unmodified point-to-multipoint service information in the network, wherein the certain period is a modification period including a plurality of repetition periods, the modified point-to-multipoint service information is received periodically during the modification period and the unmodified point-to-multipoint service information is repeated every repetition period and received periodically during the modification period.

2. The method of claim 1, wherein the modified point-to-multipoint service information comprises a change indicator and updated information associated with the change indicator.

3. The method of claim 2, wherein the change indicator comprises a list of point-to-multipoint services that are modified in the certain period.

4. The method of claim 3, wherein the unmodified point-to-multipoint service information comprises a non-change indicator and non-updated information associated with the non-change indicator.

5. The method of claim 4, wherein the non-change indicator comprises a list of point-to-multipoint services that are unmodified in the certain period.

6. The method of claim 5, further comprising determining whether the point-to-multipoint service information was properly received in a previous certain period.

7. The method of claim 6, further comprising determining whether to receive the updated information in the certain period based on the change indicator if the point-to-multipoint service information was properly received in the previous certain period.

8. The method of claim 6, further comprising determining whether to receive the updated information and the non-updated information in the certain period based on the change indicator and the non-change indicator if the point-to-multipoint service information was not properly received in the previous certain period.

9. The method of claim 1, further comprising:
receiving the unmodified point-to-multipoint service information during the certain period from the network.

10. The method of claim 9, further comprising determining whether the unmodified point-to-multipoint service information comprises the information associated with the point-to-multipoint service to enable reception of the point-to-multipoint service.

11. The method of claim 9, further comprising receiving the unmodified point-to-multipoint service information again during the certain period if the unmodified point-to-multipoint service information is not properly received.

12. The method of claim 1, further comprising receiving the modified point-to-multipoint service information again during the certain period if the modified point-to-multipoint service information is not properly received.

13. The method of claim 1, wherein the modified point-to-multipoint service information is received once during each of the repetition periods.

14. The method of claim 1, wherein the modified point-to-multipoint service information does not change during the certain period.

15. The method of claim 1, wherein the network is a universal mobile telecommunications system (UMTS) terrestrial radio network (UTRAN).

16. The method of claim 1, further comprising:
establishing a point-to-multipoint service connection between the UE and the network.

17. A method for controlling user equipment (UE) capable of receiving a point-to-multipoint service in a wireless communication system, the method comprising:
separating point-to-multipoint service information comprising at least one service identifier into at least modified point-to-multipoint service information and unmodified point-to-multipoint service information; and
transmitting the modified point-to-multipoint service information and the unmodified point-to-multipoint service information to the UE periodically during a certain period,
wherein the certain period is a modification period including a plurality of repetition periods and the unmodified point-to-multipoint service information is repeated every repetition period.

18. The method of claim 17, wherein the modified point-to-multipoint service information comprises a change indicator and updated information associated with the change indicator.

19. The method of claim 18, wherein the change indicator comprises a list of point-to-multipoint services that are modified in the certain period.

20. The method of claim 17, wherein the unmodified point-to-multipoint service information comprises a non-change indicator and non-updated information associated with the non-change indicator.

21. The method of claim 20, wherein the non-change indicator comprises a list of point-to-multipoint services that are unmodified in the certain period.

22. A user equipment (UE) capable of receiving a point-to-multipoint service in a wireless communication system, the user equipment comprising:
means for receiving point-to-multipoint service information comprising at least one service identifier during a certain period from a network, the point-to-multipoint service information separated into at least modified point-to-multipoint service information and unmodified point-to-multipoint service information in the network,
wherein the certain period is a modification period including a plurality of repetition periods, the modified point-to-multipoint service information is received periodically during the modification period and the unmodified point-to-multipoint service information is repeated every repetition period and received periodically during the modification period.

23. The user equipment of claim 22, wherein the modified point-to-multipoint service information comprises a change indicator and updated information associated with the change indicator.

24. A network for controlling user equipment (UE) capable of receiving a point-to-multipoint service in a wireless communication system, the network comprising:
means for separating point-to-multipoint service information comprising at least one service identifier into at least modified point-to-multipoint service information and unmodified point-to-multipoint service information; and
means for transmitting the modified point-to-multipoint service information and the unmodified point-to-multipoint service information to the UE periodically during a certain period,
wherein the certain period is a modification period including a plurality of repetition periods and the unmodified point-to-multipoint service information is repeated every repetition period.

25. The network of claim 24, wherein the modified point-to-multipoint service information comprises a change indicator and updated information associated with the change indicator.

\* \* \* \* \*